(12) United States Patent
Li

(10) Patent No.: US 10,707,695 B1
(45) Date of Patent: Jul. 7, 2020

(54) SYSTEM FOR DISTRIBUTING UNINTERRUPTED ELECTRICAL POWER

(71) Applicant: Jeff W H Li, Irvine, CA (US)

(72) Inventor: Jeff W H Li, Irvine, CA (US)

( * ) Notice: Subject to any disclaimer, the term of this patent is extended or adjusted under 35 U.S.C. 154(b) by 0 days.

(21) Appl. No.: 16/599,445

(22) Filed: Oct. 11, 2019

(51) Int. Cl.
*H02J 50/00* (2016.01)
*H02J 7/02* (2016.01)
*H02J 1/00* (2006.01)
*H02J 9/06* (2006.01)

(52) U.S. Cl.
CPC ............ *H02J 9/061* (2013.01); *H02J 1/00* (2013.01); *H02J 7/025* (2013.01); *H02J 50/00* (2016.02)

(58) Field of Classification Search
CPC .... H02J 1/00; H02J 7/025; H02J 9/061; H02J 50/00

USPC .......................................................... 307/23
See application file for complete search history.

(56) References Cited

U.S. PATENT DOCUMENTS

| 5,326,931 | A | * | 7/1994 | Cain | H02G 3/123 |
| | | | | | 174/503 |
| 8,319,471 | B2 | * | 11/2012 | Adest | H02J 7/0004 |
| | | | | | 320/103 |
| 2018/0262062 | A1 | * | 9/2018 | Kato | H02J 50/60 |
| 2019/0131810 | A1 | * | 5/2019 | Lim | H02J 7/0054 |

* cited by examiner

*Primary Examiner* — Hal Kaplan
(74) *Attorney, Agent, or Firm* — Feng Qian

(57) ABSTRACT

A power distribution system for delivering DC electrical power is provided. The power distribution system comprises a power distribution device and a power interface. The power distribution device comprises a power storage device. The power interface is configured to distribute the DC electrical power from the power distribution device and charge the power distribution device using an external power input.

14 Claims, 9 Drawing Sheets

SYSTEM FOR DISTRIBUTING UNINTERRUPTED ELECTRICAL POWER

TECHNICAL FIELD

The present disclosure relates to a system for distributing electrical power and, in particular relates to a system for distributing uninterrupted direct current (DC) electrical power.

BACKGROUND

Uninterrupted power supply ("UPS") devices are commonly used for maintaining a supply of electrical current to electronic devices. In a plurality of applications, different electronic devices may need to be powered by DC electrical power inside and/or outside a building structure. However, the existing devices for providing uninterrupted DC power to different electronic device may be obtrusive and unattractive. For example, devices such as batteries may be placed and different electric connections may be used to connect the batteries to the AC electrical power source, thus occupying a sustainably amount of space in a building structure. Therefore, it would be desirable to have an uninterrupted DC power supply apparatus that is hidden within a building structure while providing uninterrupted power to multiple electronic devices.

SUMMARY

The technical problems to be solved by this present disclosure are to provide a design of a power distribution system for delivering DC electrical power, with features of space saving, uninterrupted power distribution, wireless charging and wireless power distribution, electrical power monitoring and indication.

The power distribution system comprises a power distribution device and a power interface. The power distribution device comprises a power storage device. The power interface is configured to distribute the DC electrical power from the power distribution device and charge the power distribution device using an external power input.

In one embodiment, the power distribution device further comprises a power management device.

In one embodiment, the power distribution device is hidden in-between two adjacent building structures.

In one embodiment, the power management device further comprises a wire connection with the power storage device.

In one embodiment, the power management device is configured to be integrated in the power storage device.

In one embodiment, the power management device is configured to have a function of over-current protection.

In one embodiment, the power management device is configured to have a function of wireless charging and a function of wireless power distribution.

In one embodiment, the power management device is configured to have a function of electrical power monitoring and indication.

In one embodiment, the power management device further comprises a wireless transmitter and a wireless receiver.

In one embodiment, the power management device is configured to have a function of current regulation for charging and power distribution.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
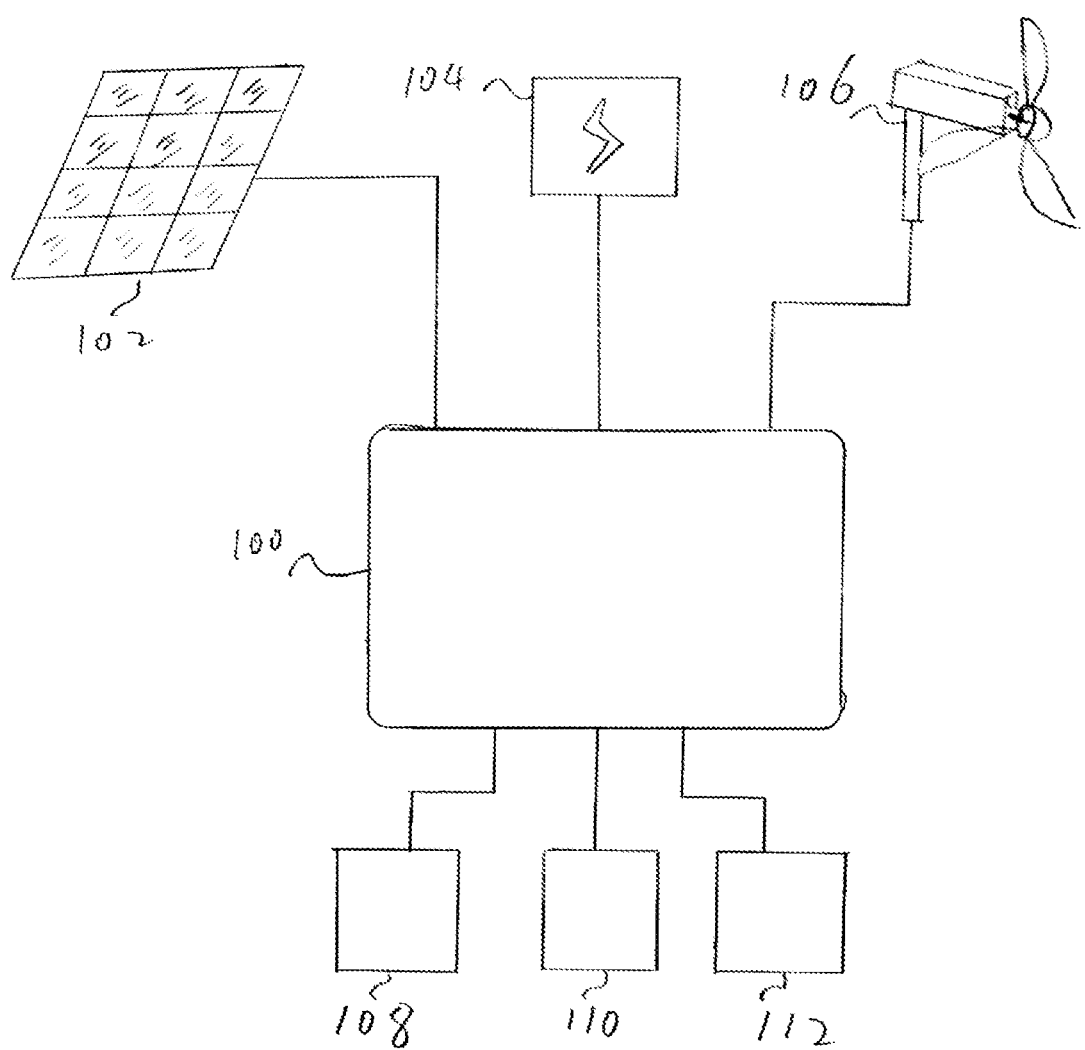
FIG. 1 is a schematic diagram of an exemplary environment for providing a power distribution system according to an embodiment of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

It is to be understood that aspects of the present disclosure will be described in terms of a given illustrative architecture; however, other architectures, structures, materials and process features and steps can be varied within the scope of aspects of the present disclosure.

It will also be understood that when an element is referred to as being "on" or "over" another element, it can be directly on the other element or intervening elements can also be present. In contrast, when an element is referred to as being "directly on" or "directly over" another element, there are no intervening elements present.

It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for a system, which may include multiple features or combinations of features. Some or all features may or may not be present on the devices in accordance with embodiments of the present disclosure.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only , or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements and/or components, but do not preclude the presence or addition of one or more other features, integers, steps, operations, elements, components and/or groups thereof.

Spatially relative terms, such as "beneath", "below", "lower", "above", "upper", and the like, can be used herein for ease of description to describe one element's or feature's relationship to another element (s) or feature (s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present disclosure.

It is to be understood that the present embodiments are not limited to the specific devices, methods, conditions or parameters described and/or shown herein, and that the terminology used herein is for the purpose of describing particular embodiments by way of example only and is not intended to be limiting. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

FIG. 1 is a schematic diagram of an exemplary environment for providing a power distribution system according to an embodiment of the present disclosure.

As illustrated in FIG. 1, an exemplary environment for providing a power distribution system comprises a power distribution system 100, a first external DC input 102, a second external DC input 104, a third external DC input 106, and DC powered devices 108, 110 and 112.

According to one embodiment of the present disclosure, the power distribution system 100 may comprise one or more DC inputs and DC outputs. The power distribution system 100 may include multiple external DC inputs, including the first external DC input 102, the second external DC input 104 and/or the third external DC input 106. As shown in FIG. 1, the first external DC input 102 is illustrated as a solar panel. The second external DC input 104 is illustrated as a DC power supply. The third external DC input 106 is illustrated as a wind turbine. However, the first external DC input 102, the second external DC input 104 and the third external DC input 106 may not be limited to solar panel, DC power supply or wind turbine. The first external DC input 102, the second external DC input 104 and the third external DC input 106 can be used separately or in a combination to provide DC inputs to the power distribution system 100. The power distribution system 100 may distribute DC power to connected devices, such as the DC powered devices 108, 110 and 112. The DC powered device 108, 110 and 112 may include, but not be limited to, DC powered electric curtain, DC powered LED lights, DC powered networking devices, DC charging stations. The DC powered devices 108, 110 and 120 may be used individually or simultaneously. The power distribution system 100 may also include power storage feature, thus the power distribution function of the power distribution system 100 may continue even when there is a power interruption. The power distribution system 100 may use external DC input, such as one or more of the first external DC input 102, the second external DC input 104, the third external DC input 106, to charge the power storage. The power distribution system 100 may distribute DC power from the DC input and/or the power storage.

Although three external DC inputs are illustrated in FIG. 1, one, two, four or more external DC inputs may be used in the power distribution system 100. Although three DC powered devices are illustrated in FIG. 1, one, two, four or more DC powered devices may be used in the power distribution system 100.

Figure 2A:
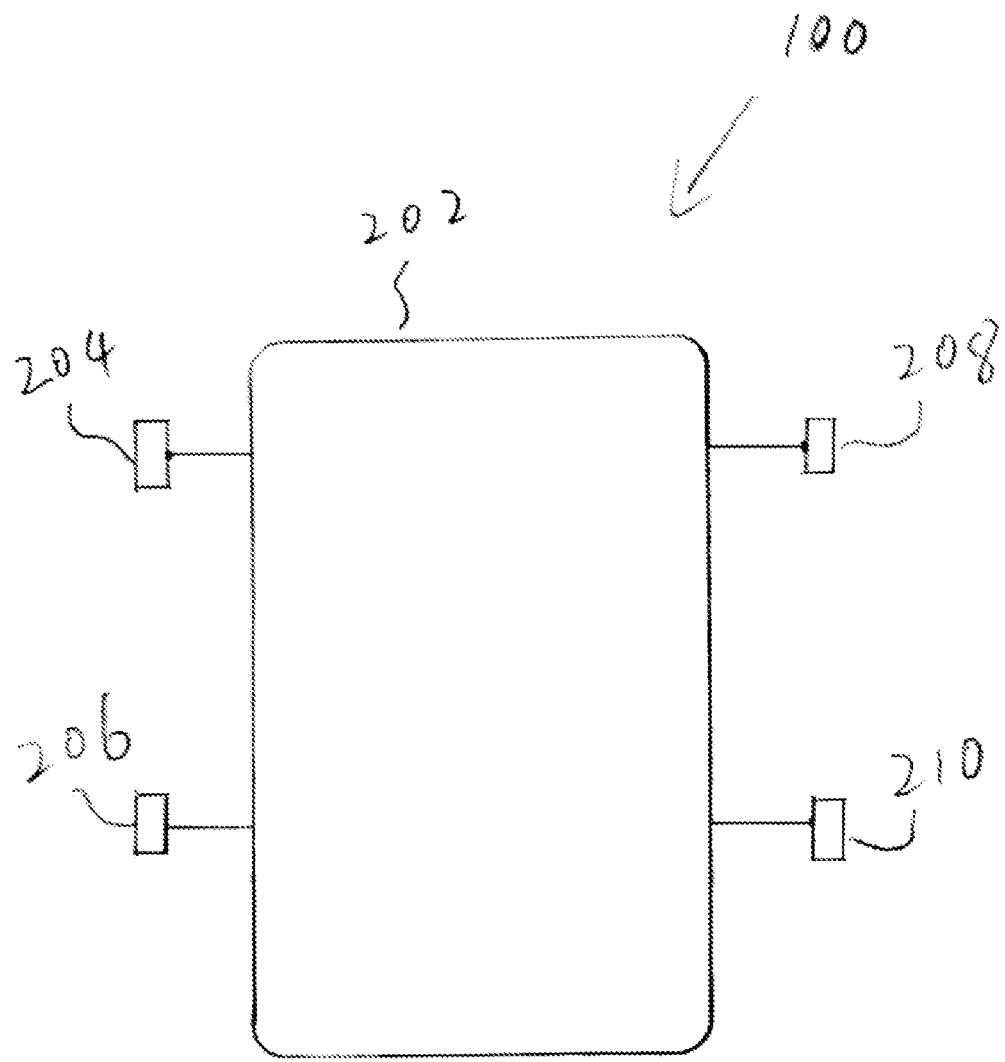
FIG. 2A is a schematic diagram of an exemplary power distribution system according to an embodiment of the present disclosure.

FIG. 2A is a schematic diagram of an exemplary power distribution system according to an embodiment of the present disclosure.

As illustrated in FIG. 2A, power distribution system 100 comprises a power distribution device 202, power interfaces 204, 206, 208 and 210. In some embodiments, the power distribution device 202 may comprise one or more implementations, as will be discussed further in details with reference to FIGS. 2B-2D.

In some implementations, the power interfaces 204, 206, 208 and 210 may be configured to connect to one or more external power sources to supply DC power to the power distribution device 202. In some implementations, the power interfaces 204, 206, 208 and 210 may be configured to supply DC power from the power distribution device 202 to DC powered devices as one or more power distribution interfaces. In some implementations, the power interfaces 204, 206, 208 and 210 may include one or more wired interfaces or wireless interfaces.

In one example, the power distribution device 202 may be charged when one or more of the power interfaces 204, 206, 208 and 210 is connected to a power source. In one example, the power distribution device 202 may distribute DC power when one or more of the power interfaces 204, 206, 208 and 210 is connected with a DC powered device.

Figure 2B:
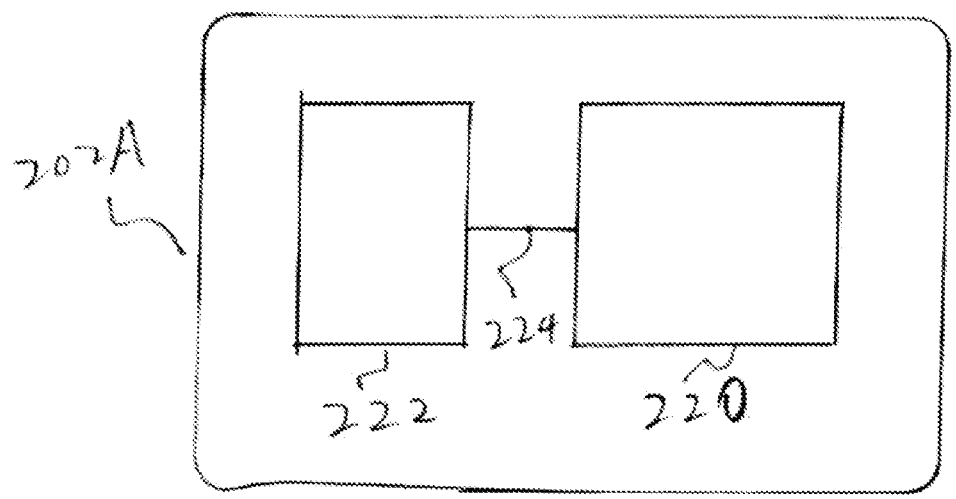
FIG. 2B is a schematic diagram of an exemplary power distribution device according to an embodiment of the present disclosure.

FIG. 2B is a schematic diagram of an exemplary power distribution device according to an embodiment of the present disclosure.

As illustrated in FIG. 2B, an exemplary power distribution device 202A comprises a power storage device 220, a power management device 222, and a connection 224.

In one example, the power storage device 220 may comprise a battery to receive DC power from the one or more power interfaces 204, 206, 208 and 210 in FIG. 2A and store the received DC power. In some implementations, the battery may include a lithium battery.

The power management device 222 may comprise one or more electronic devices to provide current management, charging management, wireless charging/discharging, electrical power monitoring and indication, and remote control.

In some implementations, the power management device 222 may comprise one or more over-current protection devices to provide current management for the power storage device 220. In some implementations, the power management device 222 may comprise one or more electronic devices such as a DC power meter to provide charging management. The DC power meter may measure voltages and current in various portions in the power distribution device 202A. For example, the current through the power storage device 220 and/or the connection 224 may be measured by a DC power meter and limited below 50 Amp.

In some implementations, the power management device 222 may comprise one or more wireless transmitters such as a battery monitor for electrical power monitoring and indication. In one example, the power management device 222 may comprise Bluetooth battery monitor to monitor the electrical power stored in the power storage device 220 and provide remote monitoring and an alert to a remoter user if the electrical power stored in the power storage device 220 is below a predetermined threshold.

In some implementations, the power management device 222 may comprise one or more wireless charging equipment, such as a wireless charger to charge through any non-metal surface, such as wood, plastic, and granite, etc. and support fast charging.

In some implementations, the power management device 222 may comprise one or more networking devices, such as a wireless module to provide remote control access to one or more users. In one example, the power management device 222 may send and receive data through the internet with the one or more networking devices. A remote user may be able to use a mobile application to send data via internet to the power management device 222. In one implementation, the remote user may be able to configure the power storage device 220 remotely, such as enable or disable the power storage device 220, and/or adjust the output voltage of the power storage device 220. In one implementation, the remote user may be able to configure the power interfaces 204, 206, 208 and 210 remotely, such as enable or disable the power interfaces 204, 206, 208 and 210, and/or adjust the output voltage of the power interfaces 204, 206, 208 and 210.

In some implementations, the connection 224 may include, for example a wire, configured to connect the power management device 222 and the power storage device 220.

In some implementations, although one power management device 222 is shown in FIG. 2B, two, three or more power management devices 222 may be included the power distribution device 202A. In some implementations, although one power storage device 220 is shown in FIG. 2B, two, three or more power storage device 220 may be included the power distribution device 202A.

Figure 2C:
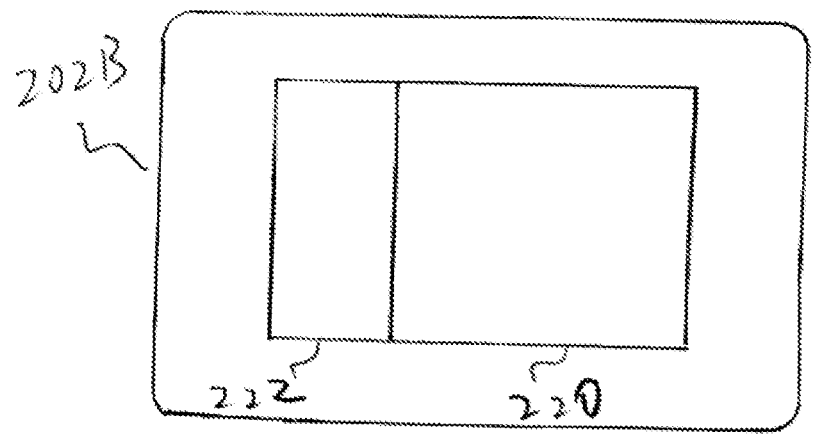
FIG. 2C is a schematic diagram of an exemplary power distribution device according to another embodiment of the present disclosure.

FIG. 2C is a schematic diagram of an exemplary power distribution device according to another embodiment of the present disclosure.

As illustrated in FIG. 2C, the power distribution device 202B comprises the power storage device 220 and the power management device 222 integrated into one device. In some implementations, although one power management device 222 is shown in FIG. 2C, two, three or more power management devices 222 may be included the power distribution device 202B. In some implementations, although one power storage device 220 is shown in FIG. 2B, two, three or more power storage device 220 may be included the power distribution device 202B.

Figure 2D:
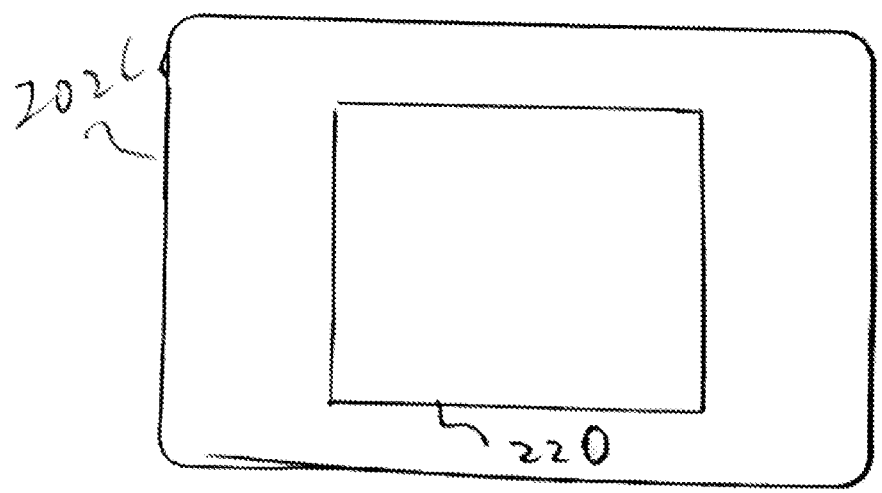
FIG. 2D is a schematic diagram of an exemplary power distribution device according to yet another embodiment of the present disclosure.

FIG. 2D is a schematic diagram of an exemplary power distribution device according to yet another embodiment of the present disclosure.

As illustrated in FIG. 2D, the power distribution device 202C comprises the power storage device 220. In some implementations, although one power management device 220 is shown in FIG. 2B, two, three or more power storage device 220 may be included the power distribution device 202B.

Figure 3:
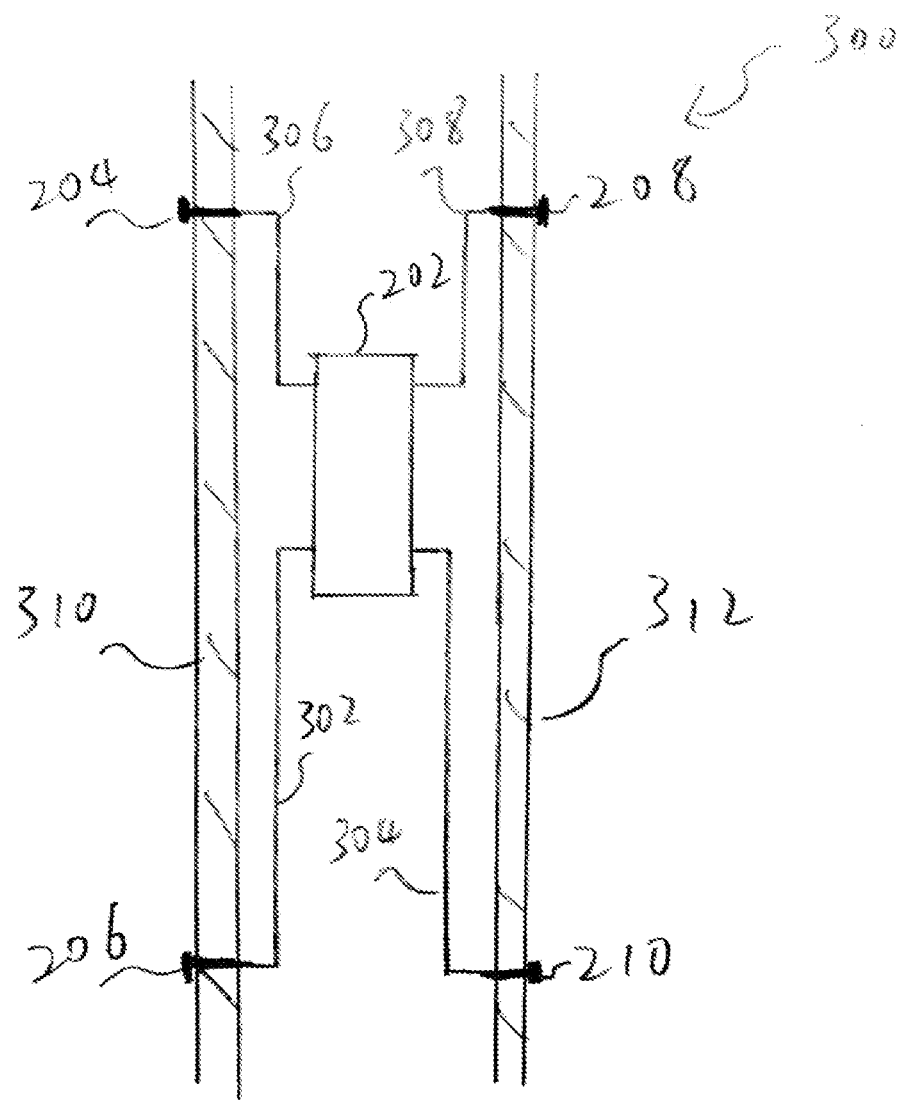
FIG. 3 is a side view of the power distribution system of FIG. 2A mounted in a building structure according to an embodiment of the present disclosure.

FIG. 3 is a side view of the power distribution system of FIG. 2A mounted in a building structure according to an embodiment of the present disclosure.

As illustrated in FIG. 3, a setup of the power distribution system 300 comprises the power distribution device 202, the power interfaces 204, 206, 208 and 210, connections 302, 304, 306 and 308, and two wall structures 310 and 312. The connections 302, 304, 306 and 308 may be electrical components which can transmit DC power, for example, power cables that may be configured to transmit DC power. The wall structures 310 and 312 may be building structures for example, drywalls that may be used to form a wall inside a house. A space may be formed in between the wall structures 310 and 312 due to building structure design. As shown in FIG. 3, the power interfaces 204, 206, 208 and 210 may be connected to the power distribution device 202 by using connections 302, 304, 306 and 308. The power distribution device 202 may be mounted in the space between the two wall structures 310 and 312 to save space. In one embodiment, the power interfaces 204, 206, 208 and 210 may be installed on the wall structures 310 and 312, and exposed outside the wall structures 310 and 312 for easy access. In some embodiments, the power interfaces 204, 206, 208, 210 may be configured to connect to one or more external power sources to supply DC power to the power distribution device 202. In some embodiments, the power interfaces 204, 206, 208, 210 may be configured to supply DC power from the power distribution device 202 to DC powered devices as power distribution interfaces. The locations of the power interfaces 204, 206, 208 and 210 can be determined as needed and to provide easy access for power input or output.

In one embodiment, the power interface 204 may be installed in a vertical high position of the wall structure 310 to provide easy access for DC powered device which may also be in a vertical high position, for example, a DC powered electrical curtain. In one embodiment, the power interface 206 may be installed in a vertical low position of the wall structure 310 to provide easy access for charging the power distribution device 202, for example, to connect with an AC to DC power adapter.

In some implementations, although power interfaces 204, 206, 208 and 210 are shown in FIG. 3, one, two, three or more power interfaces may be included in FIG. 3. In some implementations, although connections 302, 304, 306 and 308 are shown in FIG. 3, one, two, three or more connections may be included in FIG. 3.

Figure 4:
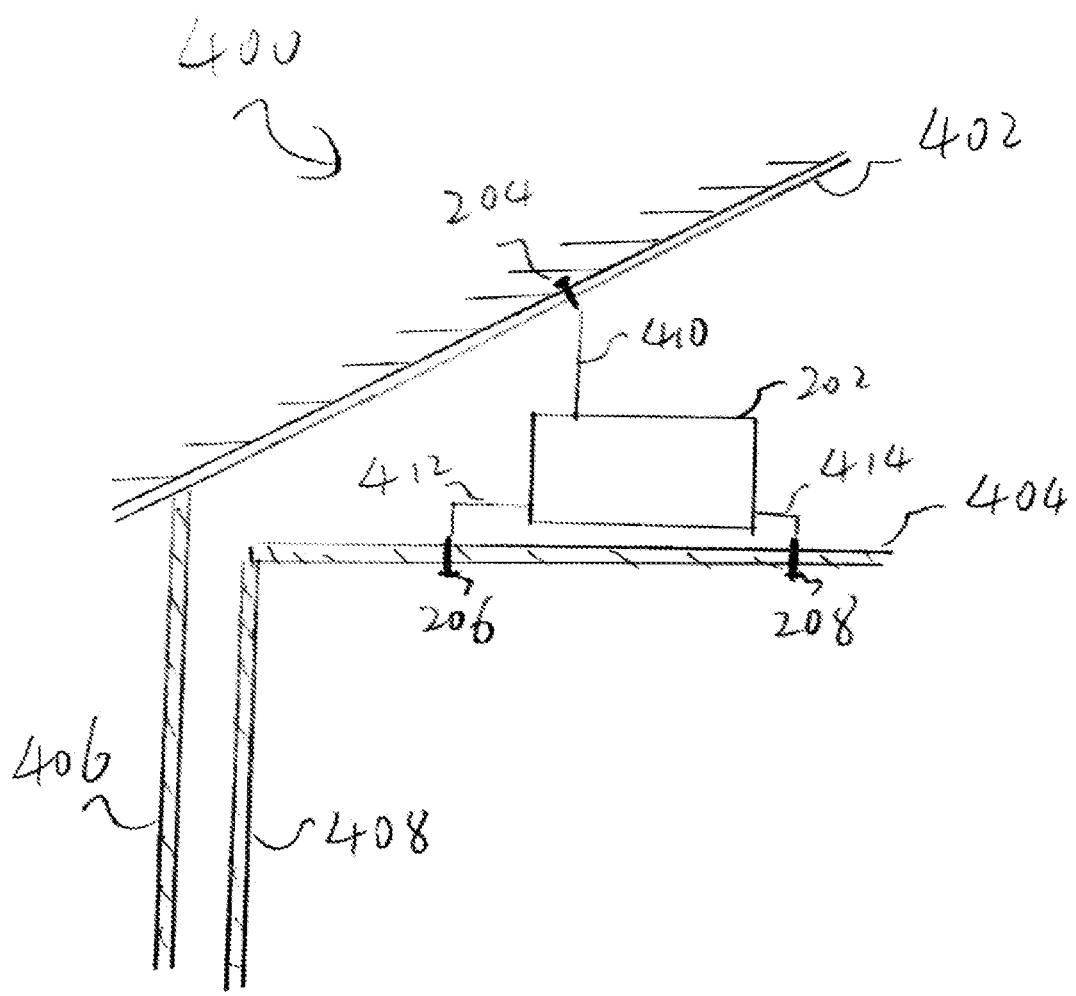
FIG. 4 is a side view of the power distribution system of FIG. 2A mounted in a building structure according to another embodiment of the present disclosure.

FIG. 4 is a side view of the power distribution system of FIG. 2A mounted in a building structure according to another embodiment of the present disclosure.

As illustrated in FIG. 4, a setup of the power distribution system 400 comprises a roof structure 402, a ceiling structure 404, two wall structures 406 and 408, the power distribution device 202, the power interfaces 204, 206, and 208, and connections 410, 412 and 414. In one example, the roof structure 402 may be an exterior roof of a house. In one example, the ceiling structure 404 may be a ceiling beneath the roof structure 402. The wall structures 406 and 408 may be the building structure inside a house to support the roof and ceiling of the house. As shown in FIG. 4, the roof structure 402 may be attached and supported by the wall structure 406. The ceiling structure 404 may be attached and supported by the wall structure 408. The roof structure 402 and the ceiling structure 404 may form a space in between. The connection 410, 412 and 414 may be electrical components which can transmit DC power, for example, power cables that may be configured to transmit DC power. The power distribution device 202 may be mounted in the space beneath the roof structure 402 and above the ceiling structure 404 to save space. The power interface 204 may be installed on the roof structure 402 and exposed for access from above. The power interfaces 206 and 208 may be installed in the ceiling structure 404 and exposed for access from below. The connections 410, 412 and 414 may be configured to connect the power interfaces 204, 206, and 208 with the power distribution device 202. In some embodiments, the power interfaces 204, 206, and 208 may be configured to connect to one or more external power sources to supply DC power to the power distribution device 202. In some embodiments, the power interfaces 204, 206, and 208 may be configured to supply DC power from the power distribution device 202 to DC powered devices as power distribution interfaces. The location of the power interfaces 204, 206, and 208 can be determined as needed and easy access for power input and output. In one embodiment, the power interface 204 may be installed on the roof structure 402 and configured to connect with a solar panel as a power source. In one embodiment, the power interfaces 206 and 208 may be installed in the ceiling and configured to distribute power to DC powered device, for example, DC powered LED ceiling lights.

In some implementations, although power interfaces 204, 206, and 208 are shown in FIG. 4, one, two, four or more power interfaces may be included in FIG. 4. In some implementations, although connections 410, 412 and 414 are shown in FIG. 4, one, two, four or more connections may be included in FIG. 4.

Figure 5:
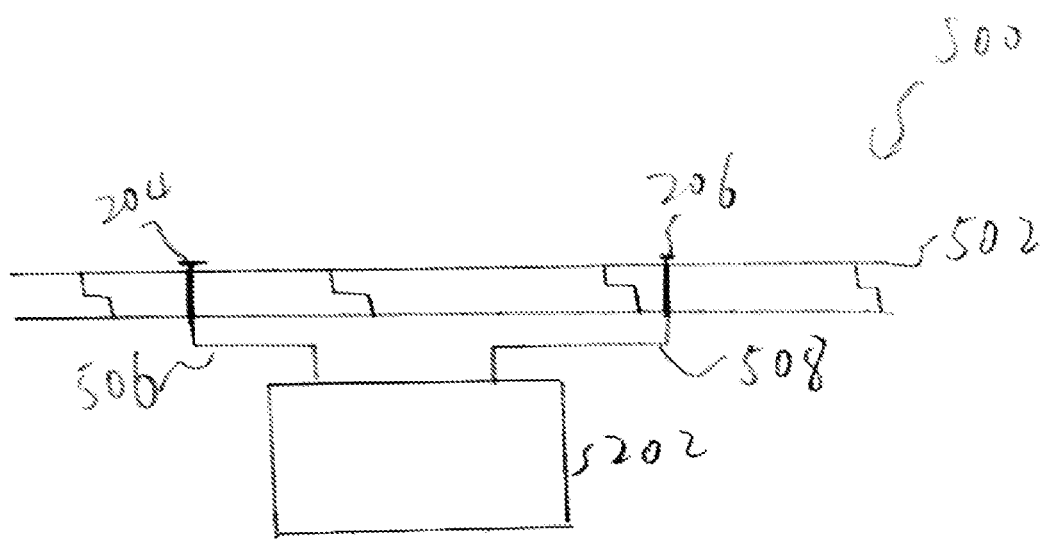
FIG. 5 is a side view of the power distribution system of FIG. 2A mounted in a building structure according to yet another embodiment of the present disclosure.

FIG. 5 is a side view of the power distribution system of FIG. 2A mounted in a building structure according to yet another embodiment of the present disclosure.

As illustrated in FIG. 5, a setup of power distribution system 500 comprises a floor structure 502, the power distribution device 202, the power interfaces 204 and 206, and connections 506 and 508. In one example, the floor structure 502 may be a structure in a building, such as a wood floor, tile surface, concrete, or carpet. The connections 506 and 508 may be electrical components which can transmit DC power, for example, power cables that may be configured to transmit DC power. The power distribution device 202 may be mounted in the space beneath the floor structure 502 to save space. The power interfaces 204 and 206 may be installed in the floor structure 502 and exposed for easy access from above. The power interfaces 204 and 206 may be connected to the power distribution device 202 by using the connections 506 and 508. In some embodiments, the power interfaces 204 and 206 may be configured to connect to one or more external power sources to supply DC power to the power distribution device 202. In some embodiments, the power interfaces 204 and 206 may be configured to supply DC power from the power distribution device 202 to DC powered devices as power distribution interfaces. In one embodiment, the power interface 204 may be configured to connect with a wireless charging device embedded in the floor to provide wireless power distribution to DC powered devices with wireless charging feature. The locations of the power interfaces 204 and 206 can be determined as needed and easy access for power input or output. In one embodiment, the power interface 204 may be installed in the floor structure 502 for easy access from above and save space.

In some implementations, although power interfaces 204 and 206 are shown in FIG. 5, one, two, three or more power interfaces may be included in FIG. 5. In some implementations, although connections 506 and 508 are shown in FIG. 5, one, two, three or more connections may be included in FIG. 5.

In some implementations, the power distribution device 202 and the power interfaces 204, 206, 208 and 210 may not be limited to be installed in one or more wall structures, ceiling structures or floor structures as shown in FIGS. 3-5. The power distribution device 202 and the power interfaces 204, 206, 208 and 210 may be installed in other spaces in a building, such as in a door structure. In one example, the power distribution device 202 may be installed in the space between door panels, and the power interfaces 204, 206, 208 and 210 may be installed in the door panels for easy access. The power distribution device 202 and the power interfaces 204, 206, 208 and 210 may be connected by electrical components configured to transmit DC power.

Figure 6:
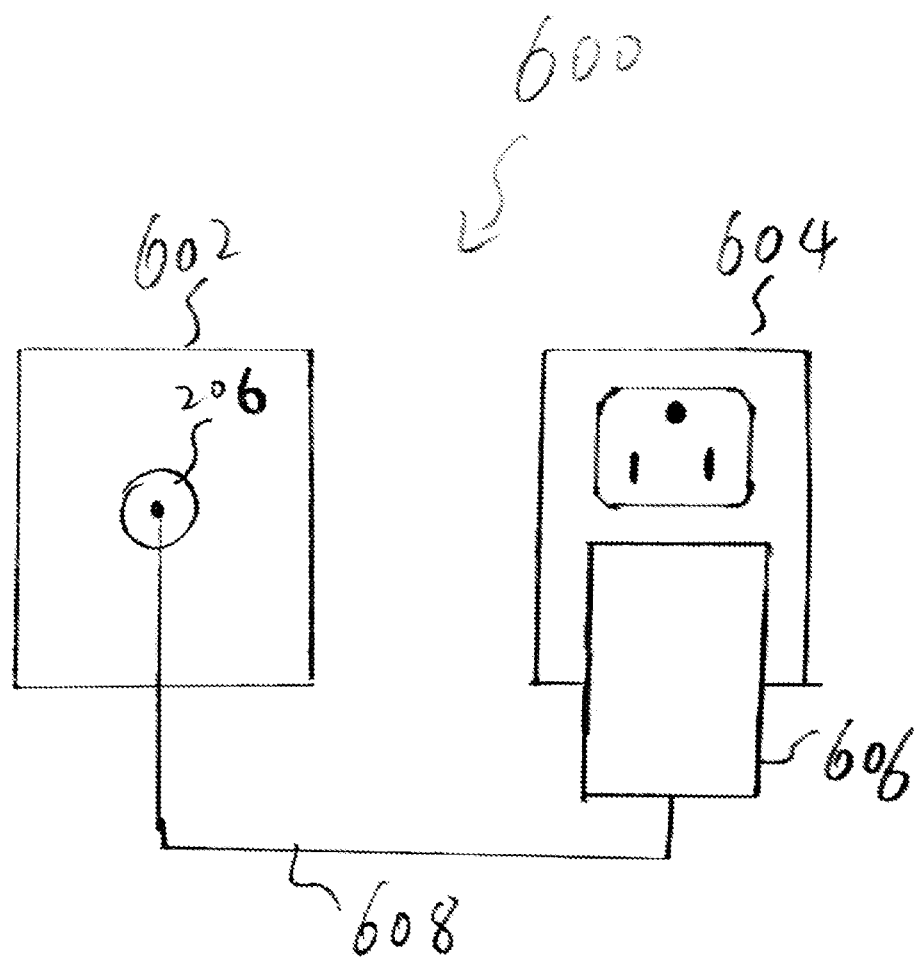
FIG. 6 is a front view of a wall structure associated with the power distribution device of FIG. 3 according to an embodiment of the present disclosure.

FIG. 6 is a front view of a wall structure associated with the power distribution device of FIG. 3 according to an embodiment of the present disclosure.

As illustrated in FIG. 6, a setup of a wall structure 600 comprises a socket 602, a wall AC socket 604, an AC to DC adapter 606 and a connection 608. The socket 602 may be a device installed in a wall structure that can provide support to other devices, for example, an electrical switch and outlet box. The wall AC socket 604 may be a 110 V AC power outlet with two outlets. The AC to DC adapter 606 may be a device that may be configured to convert 110V AC to DC power. The connection 608 may be electrical component which can transmit DC power, for example, power cables that may be configured to transmit DC power. When the power distribution device 202 is mounted between two wall structures referring to FIG. 3, the power interface 206 may be installed on the wall structure and exposed for easy access. The power interface 206 may be held in the wall by the socket 602. The power interface 206 and the socket 602 may be placed next to the wall AC socket 604. As shown in FIG. 6, an AC to DC adapter 606 may be plugged into one of the outlets of the wall AC socket 604. The AC to DC adapter 606 may be configured to connect with power interface 206 using the connection 608 and provide DC power. In one embodiment, power interface 206 may be configured to be a power input to the power distribution device 202 when an external power source is connected. The AC to DC adapter 606 may be one embodiment of the external power source of the power distribution device 202. The location of the power interface 206 can be determined as needed and easy access for power input or output.

What is claimed is:

1. A power distribution system for delivering DC electrical power, the power distribution system comprising:
   a power distribution device;
   a first power interface; and
   a second power interface,
   wherein the power distribution device comprises a power storage device,
   wherein the first power interface is different from the second power interface,
   wherein the first power interface is configured to distribute DC electrical power from the power distribution device,
   wherein the second power interface is configured to charge the power distribution device using an external power input at the same time that the first power interface is configured to distribute DC electrical power from the power distribution device.

2. The power distribution system of claim 1, wherein the power distribution device further comprises a power management device.

3. The power distribution device of claim 2, wherein the power management device further comprises a wire connection with the power storage device.

4. The power distribution device of claim 2, wherein the power management device is configured to be integrated in the power storage device.

5. The power distribution device of claim 2, wherein the power management device is configured to have a function of over-current protection.

6. The power distribution device of claim 2, wherein the power management device is configured to have a function of wireless charging and a function of wireless power distribution.

7. The power distribution device of claim 2, wherein the power management device is configured to have a function of electrical power monitoring and indication.

8. The power distribution device of claim 2, wherein the power management device further comprises a wireless transmitter and a wireless receiver.

9. The power distribution device of claim 2, wherein the power management device is configured to have a function of current regulation for charging and power distribution.

10. The power distribution device of claim 2, wherein the power management device is configured to provide remote control access to a user to configure the power storage device remotely.

11. The power distribution device of claim 2, wherein the power management device is configured to provide remote control access to a user to enable or disable the power storage device, or adjust the output voltage of the power storage device.

12. The power distribution device of claim 2, wherein the power management device is configured to provide remote control access to a user to configure the first power interface and the second power interface remotely.

13. The power distribution device of claim 2, wherein the power management device is configured to provide remote control access to a user to enable or disable the first power interface and the second power interface, or adjust the output voltage of the first power interface and the second power interface.

14. The power distribution system of claim 1, wherein the power distribution device is hidden in-between two adjacent building structures.

* * * * *